(12) United States Patent
Audouard et al.

(10) Patent No.: US 8,471,880 B2
(45) Date of Patent: Jun. 25, 2013

(54) METHOD AND DEVICE FOR MARKING A SURFACE USING CONTROLLED PERIODIC NANOSTRUCTURES

(75) Inventors: Eric Audouard, Saint Etienne (FR); Alain Foucou, Rueil-Malmaison Cedex (FR); Jean-Pierre Massicot, Rueil-Malmaison Cedex (FR); Zbigniew Sagan, Rueil-Malmaison Cedex (FR); Benjamin Dusser, Saint Etienne (FR); Michel Jourlin, Saint Etienne (FR); Herve Soder, Saint Etienne (FR)

(73) Assignee: Advanced Track and Trace, Rueil-Malmaison (FR)

( * ) Notice: Subject to any disclaimer, the term of this patent is extended or adjusted under 35 U.S.C. 154(b) by 247 days.

(21) Appl. No.: 12/678,205

(22) PCT Filed: Sep. 15, 2008

(86) PCT No.: PCT/FR2008/001292
§ 371 (c)(1),
(2), (4) Date: May 12, 2010

(87) PCT Pub. No.: WO2009/090324
PCT Pub. Date: Jul. 23, 2009

(65) Prior Publication Data
US 2010/0253760 A1 Oct. 7, 2010

(30) Foreign Application Priority Data
Sep. 13, 2007 (FR) .................................. 07 06427

(51) Int. Cl.
*B41J 2/47* (2006.01)
(52) U.S. Cl.
USPC ........................................ 347/225

(58) Field of Classification Search
USPC ....................... 347/224, 225; 369/59.1–59.27
See application file for complete search history.

(56) References Cited

U.S. PATENT DOCUMENTS

| 5,917,798 | A  | * | 6/1999  | Horimai et al. | ............... | 369/103 |
| 7,830,775 | B2 | * | 11/2010 | Karns et al.   | ................... | 369/126 |

(Continued)

FOREIGN PATENT DOCUMENTS

| EP | 1586405 | 10/2005 |
| EP | 1788115 | 5/2007 |

(Continued)

OTHER PUBLICATIONS

M. Guillermin et al.: Applied Surface Science, vol. 253, 25 fevrier 2007 (Feb. 25, 2007), pp. 8075-8079, XP002479757.

(Continued)

*Primary Examiner* — Hai C Pham
(74) *Attorney, Agent, or Firm* — Young & Thompson

(57) ABSTRACT

A method for marking a surface by controlled periodic nanostructures includes:
  a step (500) of coding an item of information in the form of an image including values representative of the coded information and
  a step (506 to 514) of marking, dot by dot, an area of the surface with a polarized laser beam to form oriented nanostructures on or in the surface, by modulating the laser beam's polarization for each marking dot according to the value of a dot of the image. In embodiments, during the marking step, a pulsed laser is utilized with a duration of less than $10 \times 10^{-12}$ seconds and an element of polarizing the light coming from the laser source and reaching the surface, designed to polarize the light according to a polarization axis that can vary according to a signal received by the polarization element, is utilized.

19 Claims, 5 Drawing Sheets

U.S. PATENT DOCUMENTS

2006/0219676 A1* 10/2006 Taylor et al. ............. 219/121.69
2007/0206480 A1* 9/2007 Kuo et al. ................. 369/112.16

FOREIGN PATENT DOCUMENTS

| JP | 2005270992 | 10/2005 |
|---|---|---|
| WO | 2007012215 | 2/2007 |

OTHER PUBLICATIONS

Yasuhiko Shimotsuma et al.: Proc. of SPIE, vol. 5662, 2004, pp. 173-178, XP002479758.
French Search Report dated May 9, 2008, in Priority Document.
International Search Report dated Sep. 22, 2009, in PCT Application.

* cited by examiner

METHOD AND DEVICE FOR MARKING A SURFACE USING CONTROLLED PERIODIC NANOSTRUCTURES

The present invention concerns a method and a device for marking a surface by controlled periodic nanostructures and a method and a device for reading information on such a surface. It applies, in particular, to marking an object or a document with a view to its identification, traceability and authentication.

A large number of marking means are known, for example by printing or by modifying a surface state. These marking means are very suitable for serial markings but offer low security with respect to identifying or authenticating the object or document marked. In particular, it is generally easy for a counterfeiter to reproduce them.

In addition, markings of the prior state of the art are generally visible, which facilitates their detection, analysis or destruction by a counterfeiter.

The existence of periodic structures, having a period of several hundred nanometers, has been highlighted scientifically (see, for example, the document by Messrs. GUILLERMIN, F. GARRELIE, N. SANNER, E. AUDOUARD, H. SODER "Mono- and multi-pulse formation of surface structures under static femtosecond irradiation" Accepted by the Appl. Surf. Sc. 253, 8075-879-2007).

Document WO 2007/01215 describes the realization of a surface structure of a stamping tool or a material in order to make a holographic effect appear on this surface. It utilizes auto-adaptive structures involving marking by continuous line presenting parallel structures over the entire length of the line. In addition, it requires tens, even hundreds, of laser shots on each dot of the line to be marked. As a result of these two characteristics, this method of marking is very slow and does not allow information other than the symbols traced with the lines to be written.

Document EP 1 586 405 describes micro-machining forming structures by laser shot. This machining aims, for example, to improve the mechanical interface between two items. It does not, therefore, enable the fight against counterfeiting in any way.

The aim of the present invention is to remedy these drawbacks.

SUMMARY OF THE INVENTION

To this end, according to a first aspect, the present invention envisages a method for marking a document, that comprises:
- a step of coding an item of information in the form of an image comprising values representative of the coded information and
- a step of marking, dot by dot, an area of said surface with a polarized laser beam to form oriented nanostructures on or in said surface, by modulating the laser beam's polarization for each marking dot according to the value of a dot of said image.

Thus, this invention utilizes unobtrusive nanostructures for coding information by using the orientation of these nanostructures. It is noted that this invention applies to the marking of all types of material, by causing a surface structuring through the orientation of nanostructures to record, dot by dot, information in the marking, said orientation having an effect on the light and thus allowing the image to be read. The utilization of this invention thus enables both very rapid marking and a high density of information in the marked area of the surface.

The information represented by said image is, for preference, an item of information designed for the identification, authentication and/or traceability of the marked surface.

According to particular features, during the marking step, a reference area is marked representing an orientation to be utilized during a step of reading said marking. Thanks to these provisions, during the reading of the code the lighting can be oriented precisely and the readability of the code is increased.

According to particular features, the marking method, as described in brief above, comprises a step of determining a signature representative of physical characteristics of dots of the marked image and a step of storing said signature.

For example, said physical characteristic is a position of an irregularity of structure, a laser beam focus, a laser beam power, a number of laser shots, an angle of incidence or a polarization angle. In this way, the marked surface can be identified subsequently based on its signature. And, if an authentic surface has been used to produce copies, at least for the first generation of copies, the authentic surface that was used can probably be determined. In this way the means of fighting counterfeiting provided by the present invention are increased.

According to particular features, during the marking step, at least half the surface of the marked area only receives a single laser shot. Thanks to these provisions, the marking speed is increased.

According to particular features, during the step of coding an item of information in the form of an image comprising values representative of the coded item of information, each dot of said image can take at least three different values and, during the marking step, the polarization of the laser beam is modulated according to at least three directions, each polarization direction being associated to one of the values of said image's dots. In this way, a marked area is formed that, once illuminated with a suitable lighting orientation, is multi-colored and bears a high density of information.

According to particular features, during the marking step, a pulsed laser with a duration of less than $10 \times 10^{-12}$ seconds is utilized.

According to particular features, the method as described in brief above comprises a step of reading said image marked on said surface and a step of verifying the quality according to the image read. The quality of the marking is thus guaranteed.

According to particular features, during the marking step, a laser beam is utilized with a dimension less than 25 µm.

According to particular features, during the marking step, dots spaced by less than 10 µm are produced.

According to particular features, during the marking step, a laser beam is utilized emitting a light with a wavelength close to 800 nm.

According to particular features, during the coding step, said image is varied for each of the marking steps to be carried out. Thanks to these provisions, simply by reading the code represented by the marking, the surface bearing the mark can be identified and thus the product that bears it.

According to particular features, during the coding step, said item of information is representative of data relating to an object or a document comprising said surface. Thanks to these provisions, directly reading at least one part of the code represented by the marking provides an identification of the object, in a similar way to a bar code.

According to a second aspect, the present invention envisages a device for marking a surface, characterized in that it comprises:
- a means of coding an item of information in the form of an image and
- a means of marking said surface with a polarized laser beam to form oriented nanostructures on or in said surface, by modulating the laser beam's polarization according to each dot of said image to be formed on said surface.

According to a third aspect, the present invention envisages a method for reading an image marked on a surface, characterized in that it comprises:
- a step of capturing an electronic image of said image marked on said surface;
- a step of processing the color of said captured image's dots and
- a step of decoding an item of information according to the color of said dots of the captured image.

According to particular features, during the electronic image capture step, a light source is oriented to illuminate the marked image with a pre-defined orientation. Thanks to these provisions, the reading of the code is improved.

According to particular features, the reading method that is the subject of this invention, as described in brief above, comprises a step of reading a mark carried by said surface and during the step of capturing an electronic image, the orientation of the light source in relation to said marked image is determined according to said mark read. Thanks to these provisions, it is easy to automatically adjust the respective positions of the marked surface and the light source.

According to particular features, the reading method as described in brief above comprises a step of determining the authenticity of the marked image, according to the decoded item of information. This information enables identification either through its content, or by errors that the decoded item of information contained during the decoding.

According to particular features, the reading method, as described in brief above, comprises a step of determining a signature representative of dots of the marked image and a step of comparing said signature with signatures stored in memory.

According to a fourth aspect, the present invention envisages a device for reading an image marked on a surface, characterized in that it comprises:
- a means of capturing an electronic image of said image marked on said surface;
- a means of processing the color of said captured image's dots and
- a means of decoding an item of information according to the color of said dots of the captured image.

As the particular characteristics, advantages and aims of this marking device, this reading method and this reading device are similar to those of the marking method, as described in brief above, they are not repeated here.

BRIEF DESCRIPTION OF THE DRAWINGS

Other advantages, aims and characteristics of this invention will become apparent from the description that will follow, made, as an example that is in no way limiting, with reference to the drawings included in an appendix, in which.

DETAILED DESCRIPTION OF THE PREFERRED EMBODIMENTS

Figure 1:
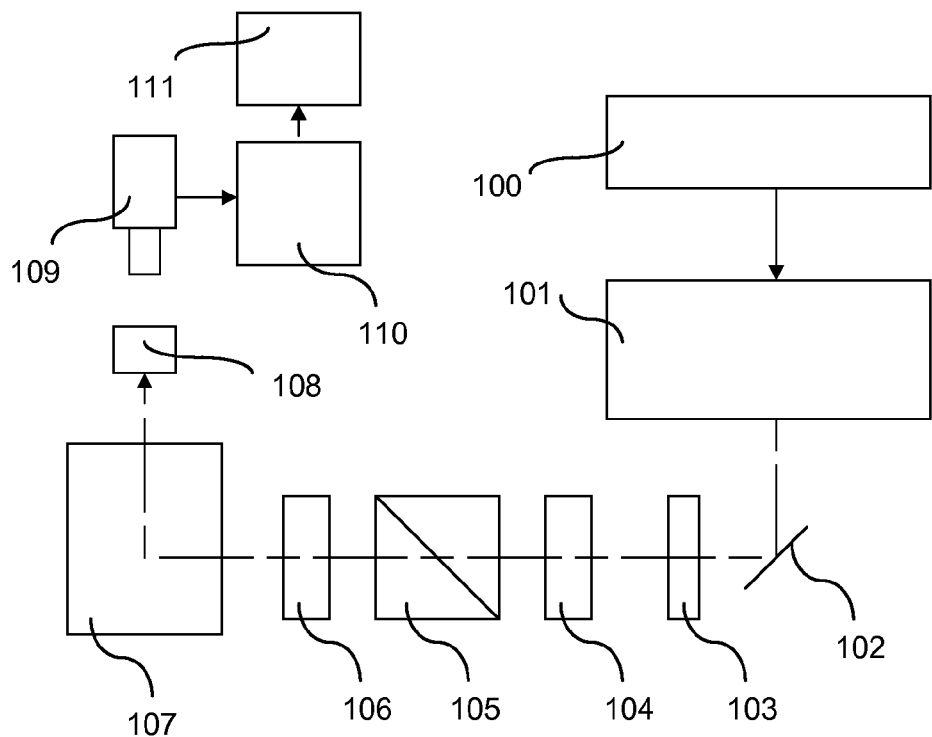
FIG. 1 represents, schematically, a particular embodiment of the marking device that is the subject of this invention, and of its operating conditions.

FIG. 1 shows a means of control 100, a laser 101, a mirror 102, a diaphragm 103, a polarizer 104, a separator cube 105, a polarizer 106, a scanner 107 and a surface to be marked 108.

The means of control 100 of the laser 101 is designed to determine an image to be marked on the surface 108, image formed of a table of areas, each bearing a coded item of information. The areas can have identical or different forms. In the rest of the description, and in the figures, all the areas of the table are considered to be squares of the same dimensions. The table represented by the image to be marked thus forms an area matrix.

The item of information carried by each area can be binary or not. As described below, at least one (here each) information value carried by an area corresponds to a specific polarization orientation, another value being able to correspond to an absence of marking, an absence of polarization or a different polarization orientation.

In embodiments, the means of control 100 receives a coded item of information from a computer system. In other embodiments, the means of control 100 receives information to be coded in the image and calculates the image after coding the information.

For example, during the coding, the coded item of information is representative of data relating to an object or a document comprising the surface to be marked. For example, the coded item of information represents a product reference, a serial and/or batch number, a date of manufacture, a manufacturer's reference, an identification of an owner of intellectual property rights on the product, a product destination reference.

In embodiments, the values of the information carried by the areas represent securization information of the surface, for example encrypted information.

For preference, each dot of said image can take at least three different values, which correspond respectively, during marking, to at least three values of polarization angles of the laser beam.

In embodiments, for each surface or object to be marked, the means of control 100 varies the image such that each marking corresponds to a specific image.

The means of control 100 controls the polarization orientation of the polarizer 106 according to a scan of the image, for example line by line and, in each line, column by column.

In embodiments, the means of control 100 also controls the focusing of the laser beam, the power of the laser beam, the number of laser shots and/or the angle of incidence dot by dot by making this vary from one dot to the next according to the coded image.

The laser 101 is, in embodiments, a laser source emitting pulses with a duration of a hundred femtoseconds ($100 \times 10^{-15}$ seconds) and, for preference, less than this duration.

The mirror 102, here, simply performs an angle transmission. It serves to increase the compactness of the device that is the subject of this invention.

The diaphragm 103 is positioned in the image plane of the optical system and thus defines the dimension of each area marked during a laser shot.

The polarizer 104 and the separator cube 105 jointly provide an attenuator serving to adapt the power of the laser beam on the surface to be marked 108. It is noted that other attenuation means, of known type, can replace the elements 104 and 105 to perform this attenuation function.

The polarizer 106 is designed to polarize the light that reaches the surface to be marked 108, by polarizing the light from the separator cube 105, the polarization angle depending on the value of a signal representing the image coding an item of information, signal emitted by the means of control 100. For example, the polarizer 106 is a PLZT ceramic or ferroelectric liquid crystal polarizer or a static polarizer rotated by an electric motor (not shown).

The scanner 107 is designed to cause the scanning of the surface 108 in a way synchronized with the scanning of the image provided by the means of control 100. In this way a synchronized scan is carried out of, firstly, each line of the image provided by the means of control 100 and, secondly, parallel lines on the surface to be marked 108. For example, the scanner 107 is equipped with mirrors mounted on piezoelectric ceramics.

The surface to be marked 108 is, for example, metal, silicon, paper, plastic or cardboard. It is noted that, in general, any material can be marked in this way but the powers implemented will be different. For example, they are higher for marking metals than for marking dielectric materials.

FIG. 1 also shows an image capture means 109, an image processing means 110 and a storage means 111.

The image capture means 109 comprises an oriented light source, as described below, and an image capture device, for example a camera or an electronic camera.

The image processing device 110 is designed to determine, firstly, the quality of the marking and, secondly, physical characteristics of the image marked on the surface 108, according to the electronic image provided by the image capture means 109. For preference, these physical characteristics represent irregular, unpredictable or random phenomena such as, for example, the positions of forks of lines.

Based on these physical characteristics, the image processing means 110 determines a signature for the image. The operation of the image processing means 110 is detailed with regard to FIGS. 5A and 5B.

In effect, the structure of the nanostructures formed by extremely short laser irradiation is not only characterized by a period of several hundred nanometers. Finer characteristics, or irregularities, such as the number of forks between lines of pseudo-periodic nanostructures, the average length of the lines between two forks, the shapes of the fork figures, are also analyzed and quantified by suitable image analysis algorithms. In this way a unique digital signature of a specific interaction between the laser and the material (in the same way as a fingerprint for a human being) can be obtained from a nanostructure figure. This specific characteristic is stored in order to be put to use in the identification, authentication and traceability procedures.

In other embodiments, the signature is representative of physical characteristics of dots of the marked image corresponding to a laser shot or a series of separate laser shots. For example, this physical characteristic is a laser beam focus, a laser beam power, a number of laser shots, an angle of incidence or a polarization angle. To determine this characteristic and, as a result, the signature of the marked surface, the color calibration data described below are used, for example (see FIG. 6 in particular). For example, the distribution of the colors obtained when the image is taken is representative of the number of laser beam shots made on the dots in question.

The storage means 111 is designed to store the image's signature and associated information, i.e. for example the content of the information represented by this image, content provided by the means of control 100.

In a first embodiment of this invention, the device for marking a mold is utilized, all the items molded with this mold reproducing the nanostructure realized with the device on the mold. It is noted that this serial manufacturing nevertheless allows the molded items to be individually identified. For this purpose, an image of the nanostructure is captured and the position of random molding errors is determined and then the distribution of these random errors. This distribution is then stored, for example in a database that can be accessed remotely, for example via the Internet network, in association with an identifier of the item (for example, a date of manufacture, batch or individual serial number). During the subsequent recognition of the item to identify, an image of the nanostructure is again captured, the position and distribution of the molding errors are determined and this distribution is compared with those stored in memory to identify the item by the other data stored with regard to this signature (for example, serial number, date and place of manufacture, batch number, recipient, manufacturing order). It is noted that this identification function is combined with an anti-copy function, any copying of a molded item or the mold causing the appearance of additional copy errors that are identified in the same way as the item's identity, for example according to the total number of errors in the mark.

In a second embodiment of the device that is the subject of this invention, each object, or document, is individually the object of a marking by the device, the image and the mark thus formed varying, independent of the marking errors, from one object to the next or one batch to the next.

Figure 2:
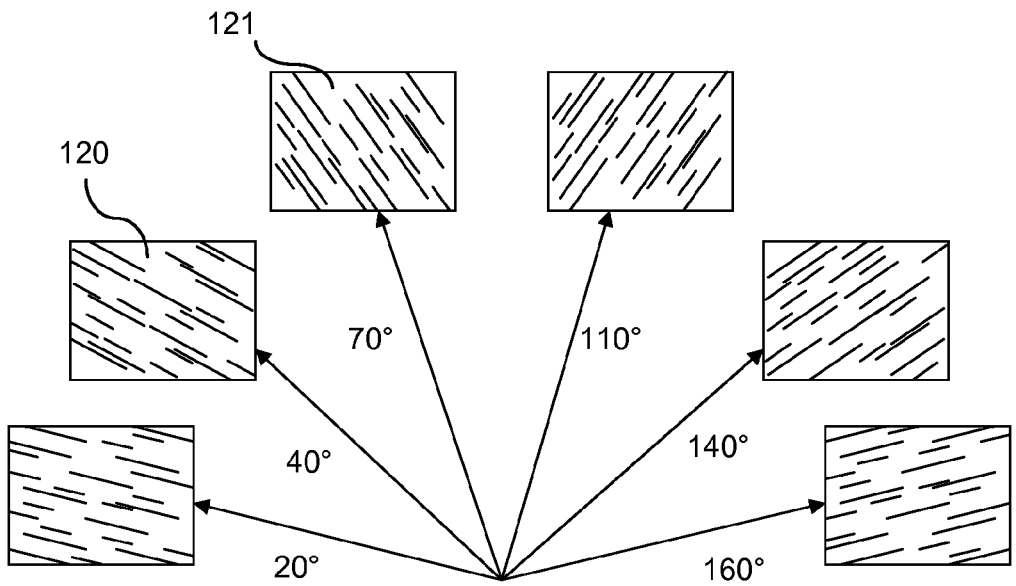
FIG. 2 is an illustration of the orientation of nanostructures according to the polarization orientation of the light, orientation expressed in degrees of angle, in FIG. 2.

FIG. 2 shows that, according to the polarization angle of the laser beam, represented on arrows leading to images of nanostructures, the orientation of the nanostructures varies. For example, the longest lines of nanostructure 120, realized with a polarization angle of 40° with respect to the horizontal, are oriented at approximately 40° and the longest lines of nanostructure 121, realized with a polarization angle of 70° with respect to the horizontal, are oriented at approximately 70°. However these angles are measured from two perpendicular straight lines. In effect, the lines of nanostructure 121 are noticeably perpendicular to the polarization plane of the light from the laser.

Figure 3:
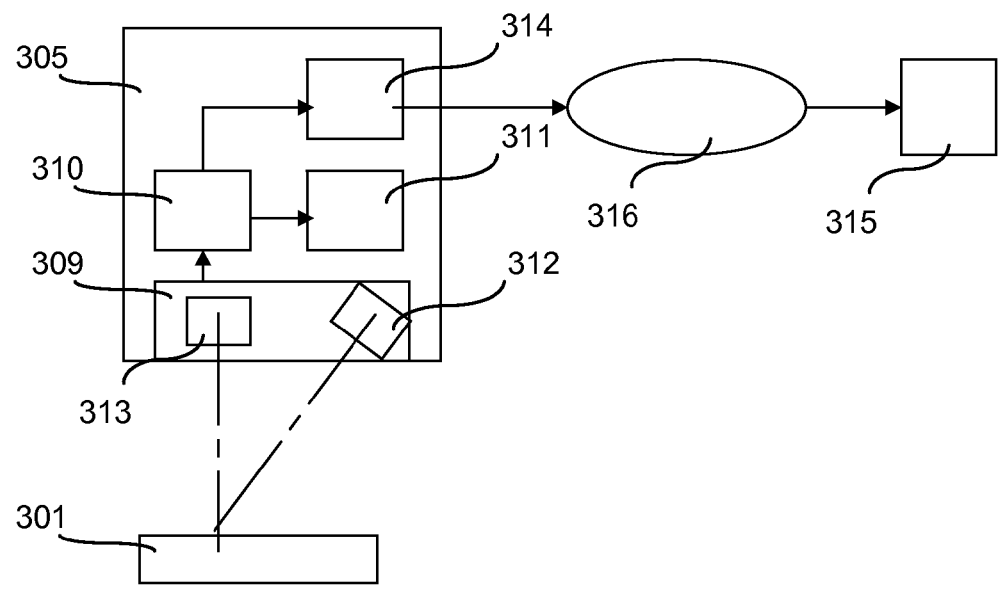
FIG. 3 represents, schematically, a particular embodiment of the reading device that is the subject of this invention.

FIG. 3 shows an information reading device 305 comprises an image capture means 309, an image processing means 310 and a storage means 311.

The image capture means 309 comprises an oriented light source 312 and an image capture device 313, for example a camera or an electronic camera.

The image processing device 310 is designed to determine:
firstly, the color corresponding to each marked dot of the marked area 302 observed (see FIG. 4), according to known color recognition techniques and marked area recognition techniques and,
secondly, physical characteristics of the image marked on the surface 301, according to the electronic image provided by the image capture means 309. Based on these physical characteristics, the image processing device 310 determines a signature for the image similar to that utilized during the marking of the surface in question, as detailed with regard to FIGS. 5A and 5B.

Then the image processing means 310 transmits this signature to a remote server 315, by the means of a network interface 314 and a telecommunications network 316, for example telephone or Internet. The remote server 315 compares this signal to the contents of a database of signatures. In return, an identifier of the object (for example, a date of manufacture, batch or individual serial number) is provided by the remote server 315.

At the same time, the image processing device 310 determines, according to the rate of errors in the mark, whether the image is an original or a copy, a copy presenting an error rate greater than a limit value (limit value possibly stored in memory in association with the mark's signature or represented by information coded in the mark realized).

It is noted here that the term errors can be applied to each of the physical characteristics utilized for determining the signature or reading the information coded in the mark read. For the first case, a distance is measured between the signature read and the signature stored during marking. In the second case, redundancies of the coded information are utilized and the number or rate of redundancies used to restore the coded information is measured. For example, one type of redundancy is known under the name "CRC" (acronym for "check redundancy code"). In each of the two cases, a limit value, or threshold, is used to separate marks considered to be authentic, which have fewer errors, from marks considered to be copies.

Figure 4:
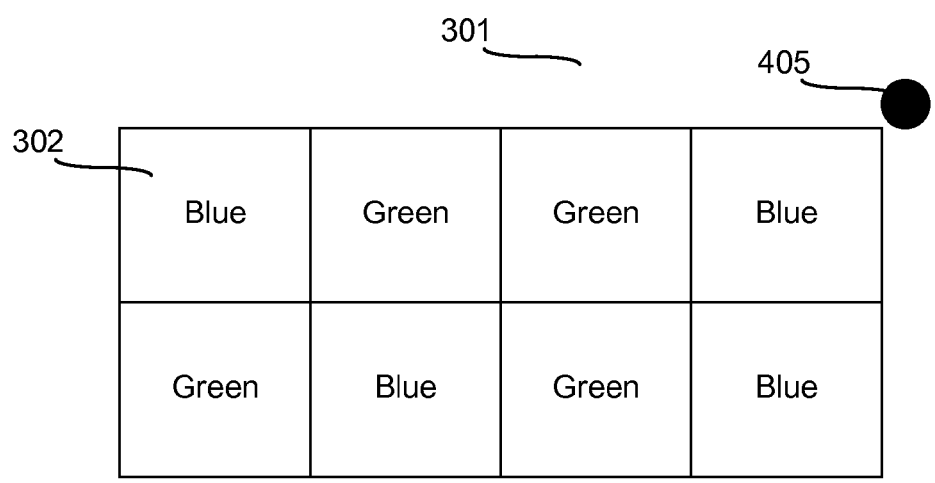
FIG. 4 represents, schematically, colors read over an area matrix, according to a lighting orientation.

As FIG. 4 shows, under correctly oriented lighting, nanostructures give, for example, blue and green colors. By assigning, for example, a binary value "1" to the color blue and a binary value "0" to the color green, byte 1 0 0 1 0 1 0 1 is associated to the image represented in FIG. 4. The color observed depends on the observation angle and the lighting angle. Exploiting the observed colors therefore requires use of colorimetric analysis. There are two possible approaches that can be used:

- a fixed reference dot 405 is put in place on or close to the marking and makes it possible to orient the reading and, in particular, the angle of incidence of the light illuminating the mark,
- an accurate and invariant determination of the colorimetric distance between two markings.

Figure 5A:
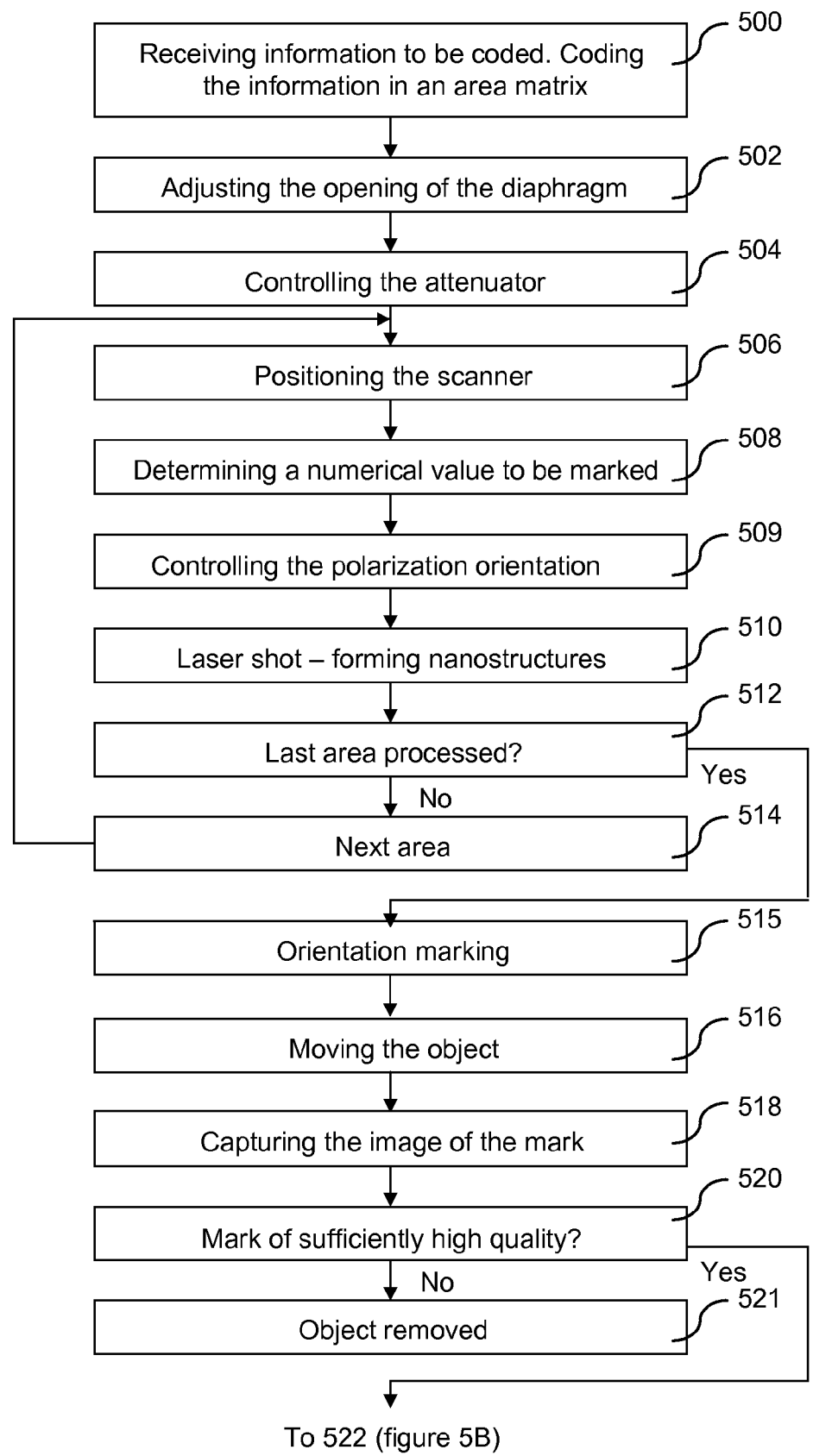
FIGS. 5A and 5B represent, in the form of a logical diagram, steps utilized in a particular embodiment of the marking method and reading method that are the subjects of this invention.
Figure 5A:
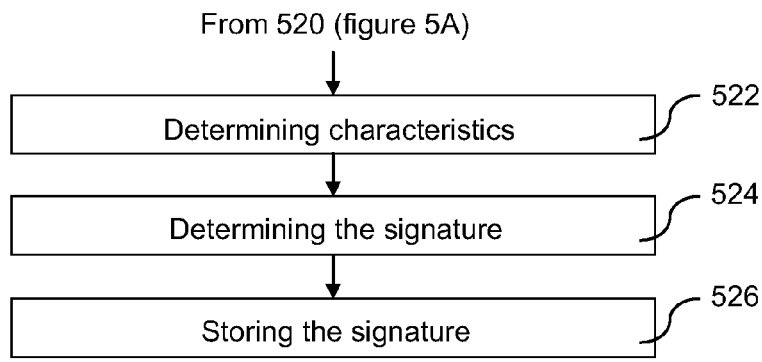
Figure 5B:
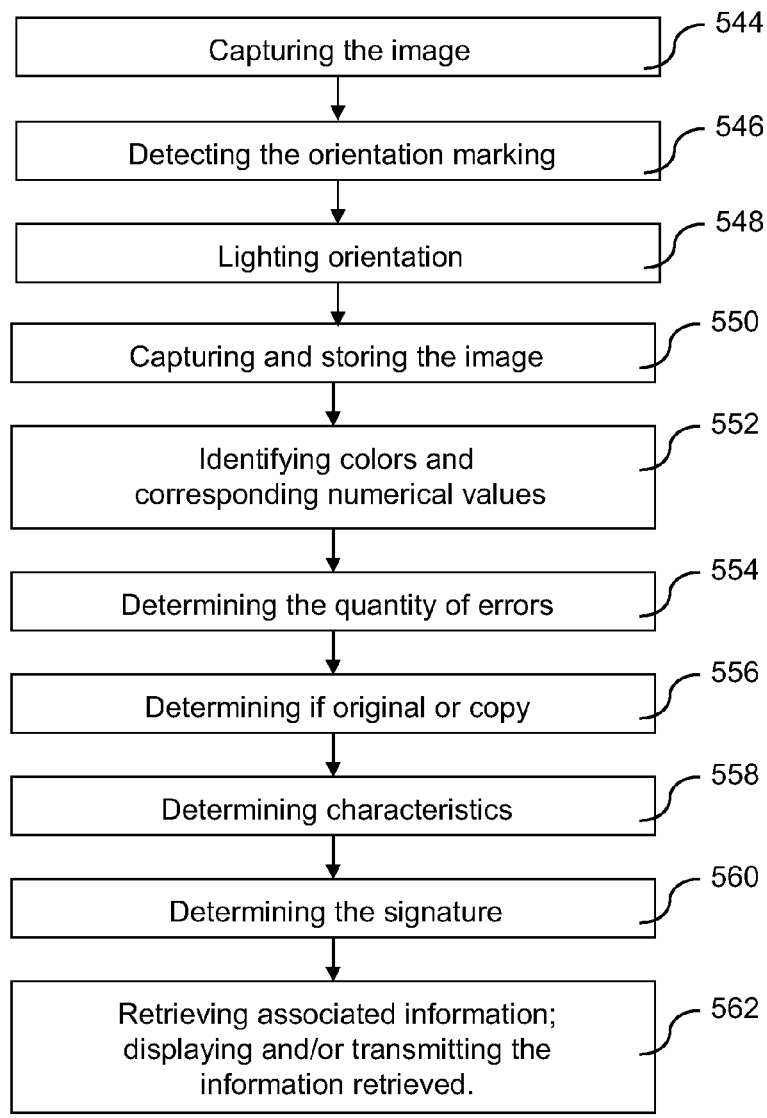

As can be seen with respect to FIGS. 5A and 5B, in an embodiment, the utilization of this invention with the devices illustrated in FIGS. 1 to 3 comprises, firstly, a step 500 of determining, for each object or document to be marked, an area matrix, each area of the matrix being associated to a value, for example binary, representing coded, and possibly encrypted, information. The coded information represented by the values associated to the areas of the matrix is, for example, an identifier of the object, a date of manufacture, a batch number or an individual serial number.

In embodiments, during the step 500 of coding an item of information in the form of an image comprising values representative of the coded item of information, each dot of said image can take at least three different values.

Then, during a step 502, an adjustment, possibly automatic, is carried out to the opening of the diaphragm 103, positioned in the image plane of the optical system to define the dimension of the area marked during a laser shot. This dimension is, for example, provided by a specification stored in memory for a batch of objects or documents to be marked.

Then, during a step 504, the attenuation of the candlepower is controlled by controlling the polarization angle of the polarizer 104 located upstream from the separator cube 105. This attenuation can be controlled automatically, for example according to a specification stored in memory and corresponding to a batch of documents or objects or according to detectors (not shown) of the color and material of the documents or objects to be marked.

During a step 506, the scanner 107 is positioned so that the first area to be formed on the object or document to be marked is on the laser beam's optical path.

During a step 508, the numerical value to be represented on the targeted area is determined, by reading this value in memory. During a step 509, the polarization angle of the polarizer 106 is turned so that this angle is representative of the numerical value to be represented.

During a step 510, at least one laser shot is carried out by emitting a laser beam of a duration of about a femtosecond and nanostructures are formed on the targeted area of the object or document to be marked.

For preference, a single laser shot is carried out for each dot to be marked. For preference, despite the overlaps of dots, at least half the surface of the marked area only receives a single laser shot.

When each dot of the image to be marked can take at least three different values, during the marking step 510, the laser beam's polarization is modulated according to at least three directions, each polarization direction being associated to one of the values of said image's dots.

During a step 512, it is determined whether the last area of the image to be formed has been processed. If not, during a step 514, it is moved to the next area to be marked and proceeded to step 506 for this new area.

This thus leads to the surface 108 being scanned in a way synchronized with the scanning of the image provided by the means of control 100.

If the result of step 512 is positive, during a step 515, an orientation mark 405 is marked on the surface to be marked. This orientation mark is representative of the orientation of a light source that allows the coded information to be read.

Then, during a step 516, the marked object or document is moved, to position it with regard to the image capture means 109 and a light source oriented so as to make appear, by diffraction, different colors in the different areas of the image. During a step 518, an image of the marked area of the object or document is captured and stored. During a step 520, it is determined whether the marking is of a sufficiently high quality, by comparing the colors with standardized colors and comparing the surfaces of the areas of the image to standardized surfaces.

If the quality is below a pre-defined level, during a step 521, the object or document is removed from the production or print chain.

Otherwise, during a step 522, physical characteristics of the image marked on the surface 108 are determined, according to the electronic image provided by the image capture means 109. For example, the position of noticeably parallel branches, or forks, of lines of the nanostructure is determined.

During a step 524, based on these physical characteristics, a signature of the image is determined.

During a step 526, firstly the signature of the image and, secondly, associated information, are stored, i.e., for example, the content of the information represented by this image, content provided by the means of control 100. The information stored at the same time as the signature is, for example, an identifier of the object, a date of manufacture, a batch number or an individual serial number.

It is noted that the memory for the signatures and associated information can be a database than can be accessed remotely, for example via the Internet network.

It is also noted that, in an embodiment in which a mold is marked, the signature is determined and stored, on the one hand, for the mold and, on the other hand, for each object molded from this mold.

During the subsequent recognition of the object or document that is to be authenticated, during a step 544, an initial image capture is carried out. Then, during a step 546, the orientation mark 405 is detected. During a step 548, a light source is oriented so as to respect the orientation identified with the mark 405. It is noted that, during step 548, the marked surface can be moved, the light source can be moved, or the light source can be selected from several fixed light sources that correspond to the orientation in question.

Then, during a step 550, an image of the nanostructure is captured and stored with an image capture means 109 and a light source oriented so as to make appear, by diffraction, different colors in the different areas of the image.

During a step 552, the colors carried by the various marked areas of the image are identified and they are associated to a message's numeric values. This message is therefore displayed, it is transmitted remotely and/or it is transmitted to a computer application. During a step 554, the quantity of errors for the message is determined, for example by determining the quantity of redundancies used to correct these errors or by comparison with the reconstituted original message. Then, during a step 556, it is determined whether the object or document is an original or a copy by comparing the quantity of errors to a pre-defined limit value.

In order to identify the object or document, during a step 558, random physical characteristics of the image marked on the surface 108 are determined, according to the electronic image provided by the image capture means 109. For example, the position of noticeably parallel branches of lines of the nanostructure or the position and distribution of errors are determined. During a step 560, based on these physical characteristics, a signature of the image is determined.

During a step 562, this signature is supplied to the remote memory and, in return, are received, firstly, a recognition item of information for this signature, where the absence of recognition can indicate that the object or document is a copy or a fake and, secondly, where there is recognition, the information associated to the signature in the remote memory. In this way, for example, the position and distribution of the molding errors or characteristic elements are compared with those represented in memory in order to identify the object or document through the other stored data. It is noted that this identification function is combined with the anti-copy function, any copying of a molded item or the mold causing the appearance of additional copy errors that are identified in the same way as the item's identity, for example according to the total number of errors in the mark.

The associated information is displayed and/or transmitted to a traceability or statistical processing application.

It is noted that, in a variant, the re-reading of the marked information is carried out via the orientation of these nanostructures. By microscopic means, the microstructures are directly detected with the help of a suitable optical device. An image analysis algorithm is then employed to determine the average orientation of each of the nanostructures associated to an area of the image.

In this way, in accordance with an aspect of this invention, an extremely short irradiation of a metal surface is carried out in order to obtain different types of nanostructures or "ripples", the orientations of which are used for coding information. In order to control the orientation of the nanostructures, the polarization strip associated to the laser is guided.

In order to retrieve the coded information the colorimetric variation caused by the variation of orientation of the nanostructures on a light whose orientation is pre-defined, is utilized.

In the rest of the description, an image acquisition system constituted of a flat-bed scanner is considered. In effect, the flat-bed scanner can be used as an indirect means of macroscopically visualizing nanostructures. This acquisition system has the interesting particularity of making a specific color correspond to an orientation of nanostructures. The light emitted by the scanner is a white light containing all wavelengths. The white light is sent over the nanostructures that have a specific orientation with respect to the illumination direction, or angle of incidence. If this orientation is integrated into the standard formula for diffraction in networks, the following formula is obtained:

$$m \cdot \lambda = d \cdot (\sin \alpha \times \cos \theta + \sin \beta)$$

where $\lambda$ is the wavelength, $\alpha$ is the angle of incidence of the light, $\theta$ is the angle between the nanostructures and the illumination direction and $\beta$ is the light beam's return angle towards the image capture device.

Assuming that the scanner equipment configuration is as follows: the fixed value of $\alpha=10°$ for the angle of incidence of the scanner's light and the fixed value of $\beta=56°$ for the beam's return in the scanner's CCD capture device, then we can deduce the value of the wavelength perceived by this capture device according to the orientation of the nanostructures on the scanner.

These perceived wavelength values range from 450 nm (blue) to 570 nm (orange) and correspond to the colors present on the images that are obtained with this acquisition system.

The colorimetric effect observed when the image is acquired is due to the diffraction of the acquisition system's light on the nanostructures marking. The diffraction of the light on these networks varies according to their qualities and morphologies and depends on the various laser marking parameters used.

Figure 6:
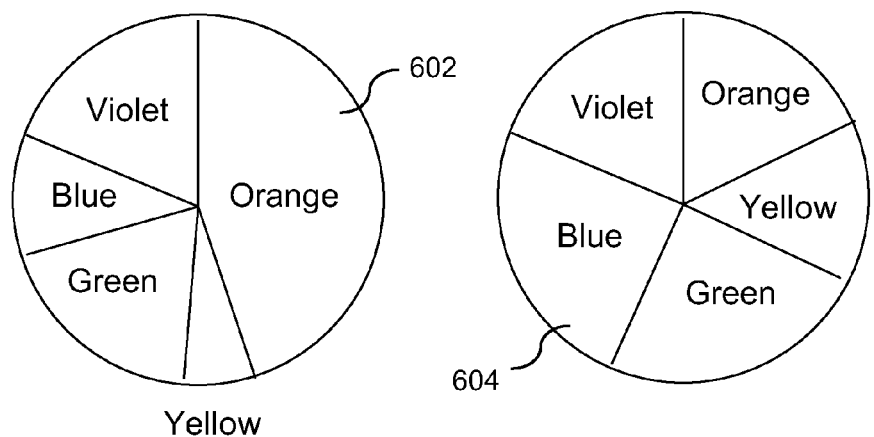
FIG. 6 represents two examples of color distributions produced with the same marking device and the same reading device based on different marking parameters and FIG. 7 represents a change of color hue obtained during a reading of a mark according to the orientation of the nanostructures.

Thus, the variation of the various laser parameters makes it possible to realize different types of nanostructures of different structures (in terms of size, pitch, form, regularity, etc). These different types of nanostructures form as many different networks, generating in their turn different diffraction phenomena. Thus, with the same laser and identical acquisition conditions, it is possible to obtain different color spectra. A precise calibration of the reading/marking system is necessary to allow the results to be exploited. FIG. 6 shows two examples of different calibrations realized with the same reading/marking device but different laser parameters.

On the left, a pie-chart 602 shows the hues obtained with a light beam ("spot") diameter of 45 μm, power of 25 mW, an overlap of 15 μm, 3 passages. On the right, a pie-chart 604 shows the hues obtained with a beam diameter of 20 μm, power of 5 mW, no overlap, 25 passages. It is noted that the colors are more uniformly distributed in the second case, on the right, than in the first.

A colorimetric resolution calculation is described below. This resolution is useful for knowing how many colors are observable with a device and with what precision two colors can be differentiated, i.e. distinguished. To enable an accurate analysis, an inter-color distance metric is introduced. The inventors have determined that a distance calculated in a suitable colorimetric space, for example "HSV" (hue, saturation, value) makes it possible to observe that the value and saturation of the colors obtained from this type of acquisition vary very little, unlike the hue.

For preference, when the information is read, there is a colorimetric transformation of the representation of a dot of the image, expressed in RGB (red, green, blue) on output from the scanner, to a representation expressed in HSV.

Figure 7:
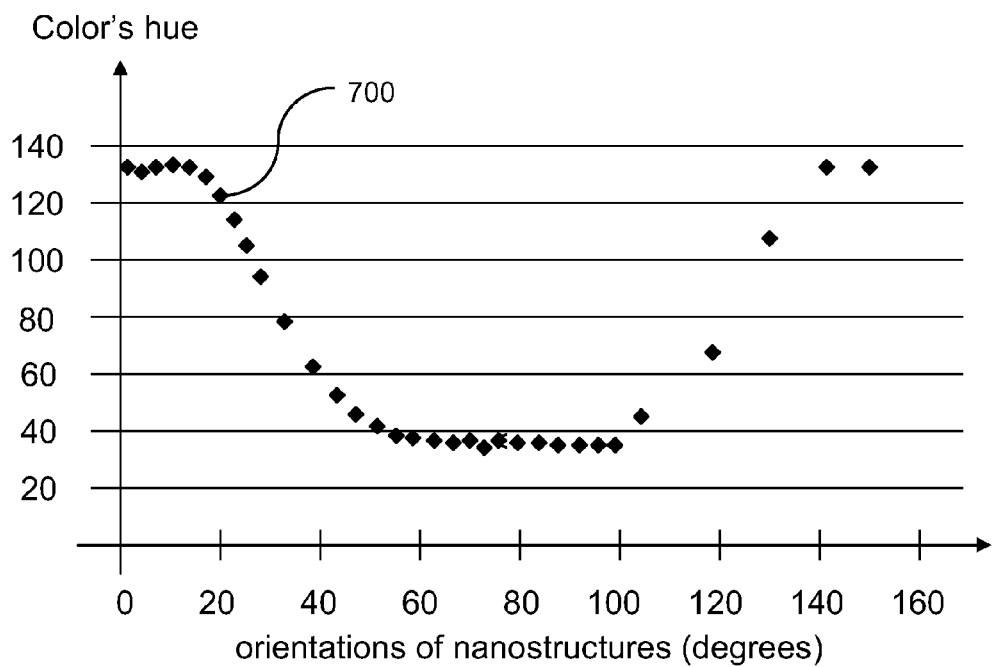

FIG. 7 represents each of the colors observed for each of the orientations of nanostructures of a sample with acquisition by a flat-bed scanner in the HSV colorimetric frame of reference. This curve 700, formed from a set of discontinuous dots, gives the change in a color's hue obtained during acquisition by a flat-bed scanner according to the orientation of the nanostructures on this scanner.

Once the hue observed for each orientation of nanostructures marked on the sample has been calculated, an ascending hierarchical classification is realized in order to determine the number of colors that can be observed and distinguished, and with what level of resolution.

The aim of the ascending hierarchical classification is to classify the individuals having a similar behavior over a set of variables. The principle is to create a partition ("dendrogram") through a two-by-two aggregation of the closest individuals or groups of individuals. The algorithm provides a hierarchy of partitions containing the classification history.

This approach nevertheless requires having a metric adapted to the individuals to be classified (Euclidian distance, standard deviation, etc). In the example reported in the table below, the Euclidian distance has been chosen. The difficulty with this classification lies in the choice for re-calculating distances after merger (simple link: merger of two groups having the smallest distance between their closest neighbors; full link: merger of two groups having the smallest distance between their farthest neighbors; average group link: merger of two groups for which the averages of distances between neighbors are the lowest; distance of the centroids: merger of two groups having the smallest distance between their barycenters)

In the light of the specificity of the individuals to be studied (an orientation of nanostructures corresponding to a hue that cannot be averaged), it is the centroids link that is used on 25 hues obtained from 25 different orientations of nanostructures varying by 4° on a scale of 0° to 100°.

The last line of this table gives, for each column, the number of discernible classes.

Observation of this dendrogram makes it possible to affirm that the current position allows discerning a maximum of twenty different classes of orientations of nanostructures in terms of hues associated with the help of the image acquisition system used to produce this dendrogram. When the merger distance increases, the number of classes that can be discerned falls.

Then, depending on the number of classes to use, the user just has to review the above dendrogram and select the corresponding orientations of nanostructures.

This system makes it possible to determine a set of classes maximizing the differentiation of their hues in relation to each other.

An example of the use of this invention is reproducing a graphic work on a metal surface using the principle described above: an orientation of nanostructures corresponding to a color. It is noted that several nanostructures can be superposed in each dot of the image.

To do this, the number of dominant colors in the work to be reproduced is characterized. Then, depending on this number, the above dendrogram is used to associate all the colors of the work to the closest color class proposed.

Having determined the number of classes wished for, each of the pixels of the original image is assigned to one of the proposed classes of hues. For example, this operation is carried out in the RGB colorimetric frame of reference. The distance of each pixel of the original image to each available color class is determined and the color of the pixel of the table is associated to that of the closest class of hue. In this way the number of colors in the image has been automatically reduced to the number of color classes available for marking and viewable by the scanner.

Having carried out this operation, the color planes corresponding to the orientations of the nanostructures to be marked are created. These planes represent what the laser

| Orientation | Merger distances of the centroids | | | | | | | | | | | | | | |
|---|---|---|---|---|---|---|---|---|---|---|---|---|---|---|---|
| | 0 | 1 | 2 | 3 | 4 | 5 | 6 | 7 hue | 8 | 9 | 16 | 17 | 18 | 34 | 77 |
| 8 | 133 | 133 | 131 | 131 | 131 | 131 | 131 | 131 | 131 | 128 | 128 | 128 | 122 | 122 | 70 |
| 0 | 131 | 131 | 131 | 131 | 131 | 131 | 131 | 131 | 131 | 128 | 128 | 128 | 122 | 122 | 70 |
| 4 | 131 | 131 | 131 | 131 | 131 | 131 | 131 | 131 | 131 | 128 | 128 | 128 | 122 | 122 | 70 |
| 12 | 131 | 131 | 131 | 131 | 131 | 131 | 131 | 131 | 131 | 128 | 128 | 128 | 122 | 122 | 70 |
| 16 | 128 | 128 | 128 | 131 | 131 | 131 | 131 | 131 | 131 | 128 | 128 | 128 | 122 | 122 | 70 |
| 20 | 122 | 122 | 122 | 122 | 122 | 122 | 122 | 122 | 122 | 128 | 128 | 128 | 122 | 122 | 70 |
| 24 | 118 | 118 | 118 | 118 | 122 | 122 | 122 | 122 | 122 | 128 | 128 | 128 | 122 | 122 | 70 |
| 28 | 110 | 110 | 110 | 110 | 110 | 110 | 110 | 110 | 110 | 110 | 110 | 110 | 122 | 122 | 70 |
| 32 | 93 | 93 | 93 | 93 | 93 | 93 | 93 | 93 | 93 | 93 | 93 | 110 | 122 | 122 | 70 |
| 36 | 75 | 75 | 75 | 75 | 75 | 70 | 70 | 70 | 70 | 70 | 70 | 70 | 70 | 45 | 70 |
| 40 | 70 | 70 | 70 | 70 | 70 | 70 | 70 | 70 | 70 | 70 | 70 | 70 | 70 | 45 | 70 |
| 44 | 60 | 60 | 60 | 60 | 60 | 60 | 60 | 60 | 52 | 52 | 36 | 36 | 36 | 45 | 70 |
| 48 | 52 | 52 | 52 | 52 | 52 | 52 | 52 | 52 | 52 | 52 | 36 | 36 | 36 | 45 | 70 |
| 52 | 45 | 45 | 45 | 45 | 45 | 45 | 45 | 52 | 52 | 52 | 36 | 36 | 36 | 45 | 70 |
| 56 | 41 | 40 | 40 | 38 | 38 | 38 | 36 | 36 | 36 | 36 | 36 | 36 | 36 | 45 | 70 |
| 60 | 40 | 40 | 40 | 38 | 38 | 38 | 36 | 36 | 36 | 36 | 36 | 36 | 36 | 45 | 70 |
| 64 | 38 | 37 | 37 | 38 | 38 | 38 | 36 | 36 | 36 | 36 | 36 | 36 | 36 | 45 | 70 |
| 68 | 37 | 37 | 37 | 38 | 38 | 38 | 36 | 36 | 36 | 36 | 36 | 36 | 36 | 45 | 70 |
| 72 | 37 | 37 | 37 | 38 | 38 | 38 | 36 | 36 | 36 | 36 | 36 | 36 | 36 | 45 | 70 |
| 80 | 37 | 37 | 37 | 38 | 38 | 38 | 36 | 36 | 36 | 36 | 36 | 36 | 36 | 45 | 70 |
| 92 | 36 | 37 | 37 | 38 | 38 | 38 | 36 | 36 | 36 | 36 | 36 | 36 | 36 | 45 | 70 |
| 76 | 34 | 33 | 33 | 33 | 33 | 33 | 36 | 36 | 36 | 36 | 36 | 36 | 36 | 45 | 70 |
| 88 | 33 | 33 | 33 | 33 | 33 | 33 | 36 | 36 | 36 | 36 | 36 | 36 | 36 | 45 | 70 |
| 96 | 33 | 33 | 33 | 33 | 33 | 33 | 36 | 36 | 36 | 36 | 36 | 36 | 36 | 45 | 70 |
| 84 | 32 | 33 | 33 | 33 | 33 | 33 | 36 | 36 | 36 | 36 | 36 | 36 | 36 | 45 | 70 |
| | 20 | 15 | 14 | 12 | 11 | 10 | 9 | 8 | 7 | 6 | 5 | 4 | 3 | 2 | 1 | must mark on each metal sample to form each orientation of nanostructures associated to the expected color.

At the macroscopic level, reading the information determines the orientation of the nanostructures thanks to the correctly controlled network diffraction effect. In this way, by utilizing the invention, the colorimetric variation is used to add information in a new reading axis of a given code. For example, nanostructures with three different orientations are added to a Datamatrix (registered trademark) with dimensions of 4 mm and these are read by means of three different colors provided by an image capture device, for example a flat-bed scanner.

The invention claimed is:

1. A device for marking a surface, that comprises:
 a means for coding an item of information in the form of an image that comprises values representative of the item of information; and
 a means for marking said surface with a polarized laser beam to form oriented nanostructures on or in said surface, by modulating a polarization of the laser beam according to each dot of said image to be formed on said surface,
 wherein the means for coding gives to each dot of said image one value among at least three different values, and
 wherein the means for marking modulates the polarization of the laser beam according to at least three directions, each polarization direction being associated to one of the values of the dots of the image.

2. The device according to claim 1, wherein, the marking means marks a reference area representing an orientation to be utilized during a step of reading said marking.

3. The device according to claim 1, further comprising a means for determining a signature representative of physical characteristics of dots of the marked image and a means for storing said signature.

4. The device according to claim 1, wherein, the marking means emits for at least half the surface of the marked area only a single laser shot.

5. The device according to claim 1, wherein, the marking means utilizes a pulsed laser with a duration of less than $10 \times 10^{-12}$ seconds.

6. The device according to claim 1, further comprising:
 a means for reading said image marked on said surface, and
 a means for verifying the quality according to the image read.

7. The device according to claim 1, wherein, the marking means utilizes a laser beam with a diameter less than 25 µm.

8. The device according to claim 1, wherein, the marking means produces dots spaced by less than 10 µm.

9. The device according to claim 1, wherein, the marking means utilizes a laser beam emitting a light with a wavelength close to 800 nm.

10. The device according to claim 1, wherein, the coding means varies said image for each of the marks to be marked.

11. The device according to claim 1, wherein, the coding means utilizes an item of information that is representative of data relating to an object or a document comprising said surface.

12. A method for marking a surface, comprising:
 a step of coding an item of information in the form of an image; and
 a step of marking said surface with a polarized laser beam to form oriented nanostructures on or in said surface, by modulating a polarization of the laser beam according to each dot of said image to be formed on said surface,
 wherein, during the coding step, the item of information being in the form of an image comprising values representative of the coded item of information, each dot of said image is given one value among at least three different values, and
 wherein, during the marking step, the polarization of the laser beam is modulated according to at least three directions, each polarization direction being associated to one of the values of the dots of the image.

13. A method according to claim 12, wherein, during the step of marking, a reference area is marked representing an orientation to be utilized during a step of reading said marking.

14. A method according to claim 12, further comprising:
 a step of determining a signature representative of physical characteristics of dots of the marked image and a step of storing said signature.

15. A method according to claim 12, wherein, during the marking step, at least half the surface of the marked area only receives a single laser shot.

16. A method according to claim 12, wherein, during the marking step, a pulsed laser with a duration of less than $10 \times 10^{-12}$ seconds is utilized.

17. A method according to claim 12, wherein, during the marking step, a laser beam is utilized with a dimension less than 25 µm and dots spaced by less than 10 µm are produced.

18. A method according to claim 12, wherein, during the marking step, a laser beam is utilized emitting a light with a wavelength close to 800 nm.

19. A method according to claim 12, wherein, during the coding step, said image is varied for each of the marking steps to be carried out.

* * * * *

UNITED STATES PATENT AND TRADEMARK OFFICE
CERTIFICATE OF CORRECTION

PATENT NO. : 8,471,880 B2  Page 1 of 1
APPLICATION NO. : 12/678205
DATED : June 25, 2013
INVENTOR(S) : Audouard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this
Eighth Day of September, 2015

Michelle K. Lee
*Director of the United States Patent and Trademark Office*